Jan. 20, 1953   J. M. LIITTJOHANN   2,625,707
POULTRY SUSPENDING DEVICE
Filed July 11, 1950   2 SHEETS—SHEET 2
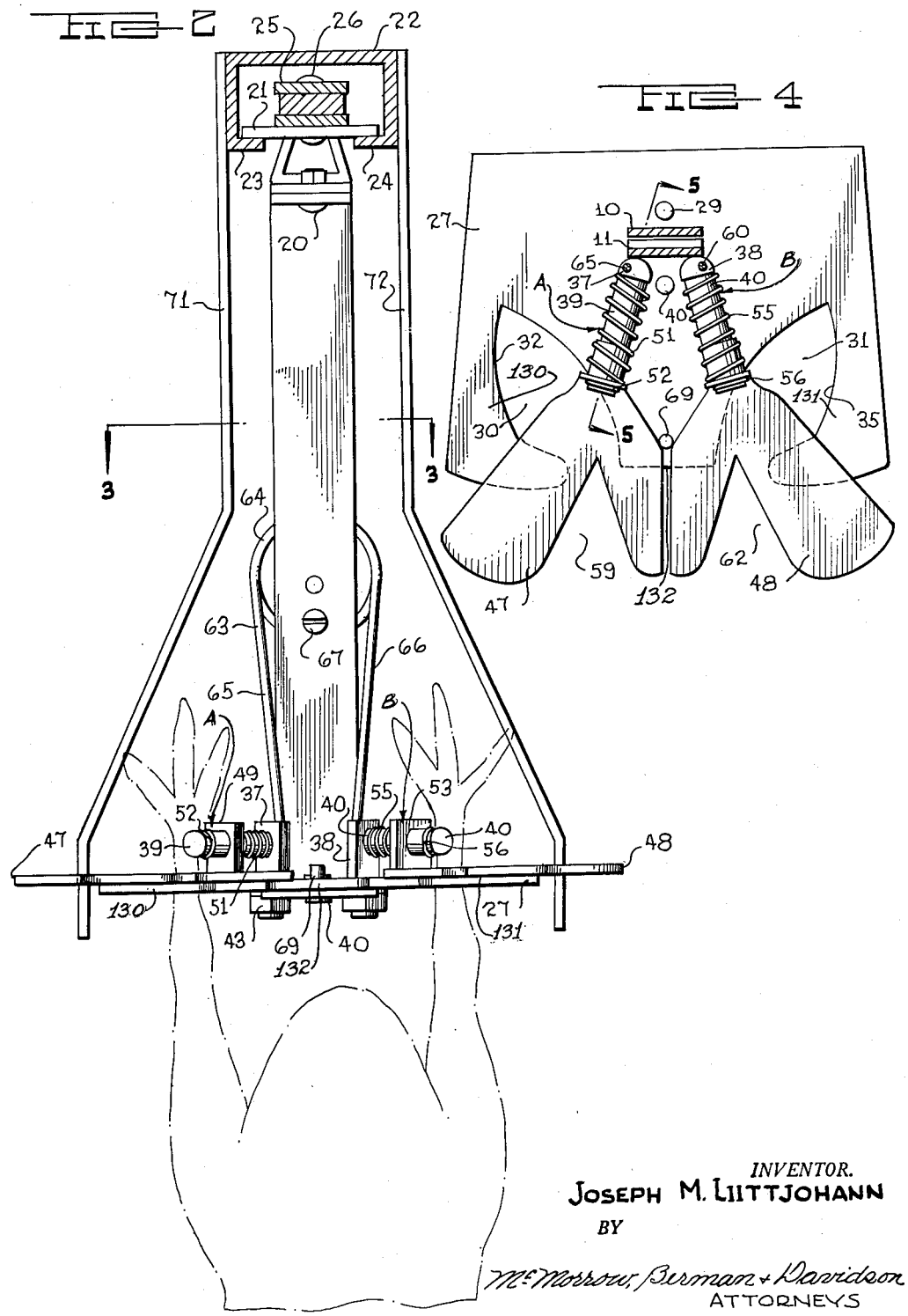
INVENTOR.
JOSEPH M. LIITTJOHANN
BY
McMorrow, Berman + Davidson
ATTORNEYS Patented Jan. 20, 1953

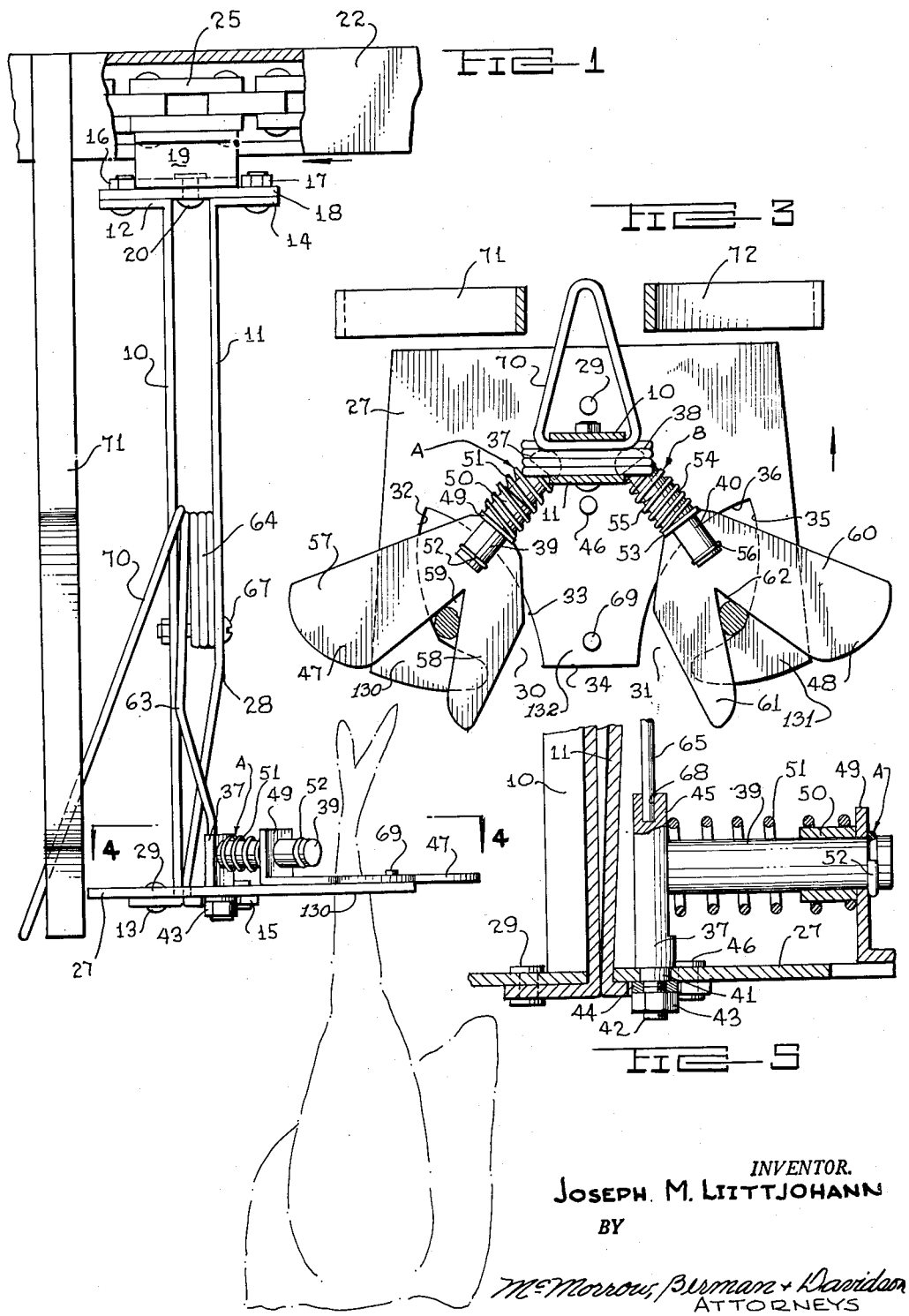

2,625,707

UNITED STATES PATENT OFFICE 2,625,707

POULTRY SUSPENDING DEVICE

Joseph M. Liittjohann, Des Moines, Iowa

Application July 11, 1950, Serial No. 173,031

6 Claims. (Cl. 17—44.1)

This invention relates to poultry suspending devices and more particularly to a shackle or gambrel device for suspending poultry by the legs from a movable conveyor chain for butchering the live birds and processing the carcasses to commercially acceptable condition.

It is among the objects of the invention to provide an improved poultry gambrel device which is particularly useful in processing chickens, such as broilers and fryers, and will be hereinafter described for this use although it may be used with equal facility in processing other kinds of poultry and could be used in larger sizes for the processing of animal carcasses, which automatically engages poultry legs placed therein and firmly grasps the legs, holding them in a spaced apart condition to facilitate removing feathers from a suspended carcass, which automatically releases a carcass suspended thereby at a predetermined station along the conveyor chain, which is swivelly mounted on the conveyor chain to permit turning of the live bird or the carcass to facilitate butchering and defeathering, which is provided with a head support for maintaining the head of a carcass suspended thereby out of a wax bath in which the carcass is dipped as a part of the final defeathering operation, which facilitates the poultry processing operation to such an extent that the work of at least one operator is eliminated, and which is simple and durable in construction, economical to manufacture, easy to install, and positive and effective in operation.

Other objects and advantages will become apparent from a consideration of the following description and appended claims in conjunction with the accompanying drawings wherein:

Figure 1 is a side elevational view of a poultry suspending device illustrative of the invention shown attached to a conveyor chain and adjacent a fixed tripping mechanism;

Figure 2 is a front elevational view of the poultry suspending device, the conveyor chain and chain carrying rail being shown in cross section;

Figure 3 is a cross sectional view on the line 3—3 of Figure 2;

Figure 4 is a cross sectional view on the line 4—4 of Figure 1 with the jaws shown in open position; and Figure 5 is a fragmentary cross sectional view on the line 5—5 of Figure 4.

With continued reference to the drawings, the poultry suspending or poultry gambrel device comprises a strut constituted by two elongated strut members 10 and 11 preferably formed of strap iron of suitable size and having their end portions disposed substantially perpendicular to the intermediate portions thereof and extending in the same direction from such intermediate portions as indicated at 12 and 13 for the member 10, and 14 and 15 for the member 11.

The end portions 12 and 14 are secured by suitable means, such as the bolts 16 and 17, to a rectangular plate 18 disposed at the side of the end portions remote from the intermediate portions of the strut members and the plate 18 is secured to a tab 19 of U-shaped cross section by suitable means such as the pivot pin or rivet 20. The rivet 20 extends through an aperture disposed substantially at the center of the plate 18 and through an aperture provided in the intermediate or web portion of the tab 19 and the legs of the tab portion are secured to a rectangular plate 21 which is disposed within a channel shaped rail 22 and rides on inwardly directed flanges 23 and 24 which extend along the opposite sides of the rail at the open side of the latter. A link chain 25 extends through the rail 22 and is secured to the plate 21 by suitable means, such as the rivet 26, for moving the supporting device along the rail.

The rail 22 and chain 25 are of endless construction so that the suspending devices are carried around a circuitous path when the poultry processing apparatus is in operation.

A plate 27, of generally rectangular shape, is disposed at the ends of the strut members 10 and 11 remote from the plate 18 and this plate 27 is provided with a slot through which the two strut members extend. The major portions of the strut members extending from the plate 18 are disposed substantially parallel to each other but, at a location adjacent the plate 27 as indicated at 28, the member 11 is bent toward the member 10 so that both of the strut members will pass through a slot in the plate 27 having a width substantially equal to the combined thickness of the two strut members.

The end portions 13 and 15 of the strut members extend away from each other at the side of the plate 27 remote from the plate 18 and the end portion 13 is rigidly secured to the plate 27 by suitable means such as the rivet 29. Two spaced apart openings 30 and 31 are provided in the plate 27 and open to the edge of the plate which is remote from the two strut members 10 and 11 and is substantially parallel to the width of the strut members. These openings 30 and 31 provide a pair of plate extensions 130 and 131 which project from the plate in spaced apart and substantially parallel relationship to each other substantially in the plane of the plate, and an intermediate portion 132 disposed between and spaced from the extensions 130 and 131.

The extensions 130 and 131 have mutually opposed, concavely curved inner edges 32 and 35 and the intermediate portion 132 has concavely curved opposite side edges 33 and 36 which respectively intersect the inner edges 32 and 35 of the extensions 130 and 131 at acute angles at the proximal ends of the extensions. The extensions are spaced at their distal ends from the intermediate portion 132 for a purpose which will presently become apparent.

Two pivot pins 37 and 38 extend through corresponding apertures in the plate 27 adjacent the strut member 11 and at respectively opposite sides of this strut member, and two arms 39 and 40 are secured one to each of the pins 37 and 38 and extend from the corresponding pins substantially at right angles thereto.

As illustrated in Figure 5 in connection with the pin 37, this pin has a portion 41 of reduced diameter rotatably received in an aperture in the plate 27 and providing an annular shoulder bearing on the upper surface of the plate. The portion 41 has a length substantially equal to the thickness of the plate 27 and terminates in a second annular shoulder which is substantially flush with the bottom surface of the plate. A screw threaded portion 42 of smaller diameter than the portion 41 extends from the portion 41 and received a nut 43. A washer 44 is interposed between the nut 43 and the shoulder at the adjacent end of the reduced portion 41 to provide an annular surface bearing against the underside of the plate 27. The shoulder at the upper surface of the plate 27 and the adjacent surface of the washer 44 are separated a sufficient distance so that the pivot pin does not bind against the plate 27 but is freely rotatable in the aperture provided in this plate.

The pin 38 is similarly constructed and is pivotally mounted in the plate 27 at a location spaced from the pin 37.

The pin 37 is provided with a longitudinally extending flattened surface 45 and the arm 39 is secured at one end to the flattened surface 45 intermediate the length of the pin 37 by suitable means, such as welding. The pin 38 is provided with a similar flattened surface to which one end of the arm 40 is secured.

Between the pins 37 and 38 the end portion 15 of the strut 11 is secured to the plate 27 by suitable means such as the rivet 46.

Two jaw plates 47 and 48 are mounted on the upper surface of the plate 27 in covering relationship to the openings 30 and 31 respectively.

The plate 47 has at one end an upstanding tongue 49 apertured to receive the arm 39 and a bushing 50 is secured at one end to the tongue 49 at the side of the latter remote from the plate 47 and constitutes with the tongue 49 bracket means slidably receiving the arm 39. A compression spring 51 surrounds the arm 39 between the flattened surface of the pin 37 and the tongue 49 and resiliently urges the tongue 49 in a direction away from the pin 37, this movement of the tongue being limited by a split ring 52 received in an annular groove in the arm 39 near the distal end of the latter. The jaw plate 48 is provided at one end with an upstanding, apertured tongue 53, similar to the tongue 49 and slidably receiving the arm 40. A sleeve or collar 54 is secured to this tongue surrounding the aperture therein and at the side of the tongue opposite the plate 48 and this sleeve also constitutes with the tongue 53 bracket means slidably receiving the arm 40. A coiled compression spring 55 surrounds the arm 40 between the pin 38 and the tongue 53 and urges the tongue in a direction away from the pin 38, this spring induced movement of the tongue 53 being limited by the split ring 56 secured in an annular groove in the arm 40 near the distal end of the latter.

The plate 47, the arm 39 and the spring 51 together constitute one jaw assembly A while the plate 48, the arm 40 and the spring 55 together constitute a complementary jaw assembly B.

Each of the jaw plates 47 and 48 has a shape, in plan, somewhat resembling a mitten, the plate 47 comprising two parts 57 and 58 disposed at respectively opposite sides of a V-shaped notch 59 which tapers inwardly from the front edge of the jaw plate remote from the tongue 49. The portion 57 is somewhat wider than the portion 58 and both portions have curved front edges. The jaw plate 48 has two similar portions 60 and 61 disposed at respectively opposite sides of a V-shaped notch 62 which tapers inwardly from the edge of the plate 48 remote from the tongue 53. The portion 60 is wider than the portion 61 and both portions have curved edges remote from the tongue 53. The plates 47 and 48 are so mounted that the narrower portions 58 and 61 are adjacent each other and the wider portions 57 and 60 are remote from each other and disposed at the outer sides of the plates.

A wire spring 63 is shaped to provide a centrally located coil 64 and two legs 65 and 66 extending in the same general direction from the coil 64 and spaced from each other. The coil 64 is mounted between the strut members 10 and 11 intermediate the length of the latter and held in position by a screw 67 extending through the coil and through registering apertures in the strut members and the end of the leg 65 of the spring is received in a recess 68 provided in the adjacent end of the pin 37. The end of the spring leg 66 is similarly received in a recess provided in the adjacent end of the pin 38 and the recesses in the pins 37 and 38 are located eccentrically of the pivotal axes of these two pins so that the spring 63 has a toggle action on the two jaw assemblies, resiliently holding the jaw assemblies in the opened position, as illustrated in Figure 4 when the jaw assemblies are in this position and resiliently urging the two jaw assemblies relatively away from each other to their closed position when the jaw plates 47 and 48 are moved away from the open position.

The open position of the jaw plates is determined by a stop pin 69 carried by the plate 27 substantially at the midwidth location of the intermediate portion 132 of this plate and projecting upwardly from the upper surface of the plate to engage the adjacent edges of the portions 58 and 61 of the two jaw plates 47 and 48.

When the two jaw plates 47 and 48 are in the open position, as illustrated in Figure 4, with their inner edges against the stop pin 69 the two V-shaped notches 59 and 62 are disposed inwardly of the distal ends of the corresponding extensions 130 and 131 to receive objects, such as poultry legs, placed therein.

With the jaw plates in this closed position the two legs of a chicken may be placed one in each of the notches 59 and 62. The legs are then forced apart causing the jaw assemblies to rotate about the axes of the pivot pins 37 and 38 respectively. As the jaw assemblies are rotated the chicken legs enter into engagement with the inner edges of the extensions 130 and 131 respectively and are then clamped between the edges of the jaw plates along the notches 59 and 62 therein and the inner edges of the extensions 130 and 131. The centers of curvature of the inner edges 32 and 35 of the extensions 130 and 131 are spaced from the axes of the pivot pins 37 and 38 in a direction such that the inner ends of the notches 59 and 62 tend to move outwardly of the inner edges 32 and 35 of the corresponding extensions as the jaw plates are moved away from each other. The chicken legs in the notches 59 and 62, however, restrict this relative outward movement of the inner ends of the notches relative to the inner edges of the extensions and force the plates inwardly of the corresponding arms 39 and 40 compressing the springs 51 and 55. This causes the edges of the jaw plates along the notches therein to force the chicken legs against the inner edges of the extensions 130 and 131 and firmly clamp the legs between the extensions 130 and 131 and the jaw plates 47 and 48. As explained above, when the ends of the spring 63 are moved past their dead center relationship to the pivotal axes of the pins 37 and 38, this spring 63 resiliently urges the jaw assemblies to rotate in a direction to move the jaw plates relatively away from each other. The resilient force thus exerted by the spring 63 prevents any accidental movement of the jaw plates in a direction to release the chicken legs from being clamped between the jaw plates and the extensions of plate 27.

It is contemplated that in the use of the suspension devices the legs of a live chicken will be first engaged in the suspending device in the manner indicated above and the chicken carried by the conveyor chain 25 to the butchering station where the chicken will be stuck. The chicken carcass will then be carried to a scalding tank and then to the roughing machines where most of the feathers are removed. During this de-feathering operation the suspending device may be turned about the axis of the pivot pin or rivet 26 to facilitate the de-feathering operation. The carcass is then carried to a wax bath where it is dipped in a wax which, when stripped from the carcass, will remove the pin-feathers and other feathers missed by the roughing machine or machines.

When the carcass is dipped in wax it is desirable to keep the head out of the wax as the chickens are sold with the heads on and with the heads not de-feathered.

A wire structure 70 of elongated triangular shape surrounds the strut member 10 and has its shorter side disposed at the inner side of the strut 10 and on top of the coil 64 of the spring 63. The wire structure 70 depends from the top of the coil 61 along the side of the strut member 10 remote from the strut member 11 and past the rear edge of the plate 27 having at its lower end an apex formation in which the head of a chicken carcass may be engaged to support the head in a position above the level of the wax in the wax bath so that the head will not be waxed when the carcass is dipped.

At a location beyond the station at which the wax is stripped from the carcass to remove the remaining feathers and pin-feathers, a pair of trip bars 71 and 72 depend from the rail 22 in spaced apart and substantially parallel relationship to each other and, preferably, substantially perpendicular to the rail. Intermediate their length these trip bars are bent so that their lower portions diverge symmetrically outwardly away from each other and so that the lower ends of the trip bars are separated by a distance just slightly greater than the width of the plate 27.

When a suspending device in closed position, as illustrated in Figure 3, reaches these trip bars, the trip bars contact the outer side edges of the portions 57 and 60 of the jaw plates 47 and 48 and force these jaw plates toward each other, pivoting the jaw assemblies about the axes of the pivot pins 37 and 38. This movement of the jaw plates toward each other brings the chicken legs past the distal ends of the extensions 130 and 131 and frees the legs so that the carcass will drop into a suitable receptacle placed below the suspension device. These trip bars move the jaw plates inwardly to their opened position, as illustrated in Figure 4, in which position they are held by the spring 63 as the suspension device completes its circuit around the conveyor chain and returns to the loading station.

With equipment now in use it is necessary to station an operator at the unloading station to remove the carcasses from the suspending devices. With the automatic release of the present invention the work of this operator is eliminated and the efficiency of the apparatus is greatly increased by this automatic release operation and also by the increased facility with which the chickens are first secured to the suspension devices.

It is contemplated that a number of the suspension devices will be secured at properly spaced intervals along the conveyor chain so that the process will be substantially continuous and it will not be necessary for an operator to leave his station at any time in order to carry out the process.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A poultry gambrel comprising a strut, means secured to said strut at one end thereof for attaching the strut to a conveyor chain, a flat plate secured to said strut at the other end thereof and disposed substantially perpendicular to the longitudinal center line of said strut, a pair of extensions projecting from an edge of said plate in spaced apart and substantially parallel relationship to each other and disposed substantially in the plane of said plate with their inner edges mutually opposed, a pair of jaw assemblies pivotally mounted each at one end on said plate at respectively opposite sides of said strut and respectively overlying said extensions, each of said jaw assemblies including a flat jaw plate having mutually opposed portions diverging in a direction away from the pivotal connection between the corresponding jaw assembly and said plate and providing between them a V-shaped notch the inner end of which is disposed inwardly of the inner edge of the adjacent plate extension and the outer end of which opens to the distal edge of the jaw plate, a pivot pin pivotally mounted at one end in said plate and projecting from the latter in a direction toward said one end of said strut, an arm secured at one end to said pivot pin and extending from the latter substantially parallel to said plate, bracket means on said jaw plate slidably receiving said arm for movement of said jaw plate along said arm toward and away from said pivot pin, a compression spring surrounding said arm between said pivot pin and said bracket means resiliently urging said jaw plate away from said pivot pin, and stop means on said arm limiting movement of said bracket means away from said pivot pin by said compression springs, said jaw assemblies being moved toward each other to a position at which the notches in said jaw plates are disposed inwardly of the distal ends of the corresponding extensions to receive objects placed therein, and spring means connected to said jaw assemblies and resiliently urging the latter together when they are within a predetermined distance of each other and apart when they are more than said predetermined distance from each other, said extensions having their inner edges curved in a manner such that the inner edges of said extensions move relative to said jaw plates toward the inner ends of the notches in the latter as said jaw plates move in a direction from the distal toward the proximal ends of the corresponding extensions so that objects inserted into the notches in said jaw plates when the latter are positioned adjacent each other will be clamped between said jaw plates and the corresponding extensions when said jaw plates are positioned away from each other.

2. A poultry gambrel comprising an elongated strut, means pivotally connected to one end of said strut for suspending the strut from a conveyor chain, a flat plate rigidly secured to said strut at the other end thereof and disposed substantially perpendicular to the longitudinal center line of said strut, spaced apart extensions projecting from said plate substantially in the plane of the latter and having concavely curved inner edge portions mutually opposed to each other, jaw assemblies pivotally mounted each at one end on said plate at respectively opposite sides of said strut and each including a jaw plate at its other end overlying the corresponding extension on said plate, each of said jaw plates having therein a notch opening to the distal edge thereof and extending inwardly of the inner edge of the corresponding extension, said jaw plates being movable relatively toward each other to a position at which the notches therein are disposed inwardly of the distal ends of the corresponding extensions to receive objects, such as poultry legs, placed therein and being movable away from each other to extend the inner edges of said extensions across the notches in said jaw plates and clamp objects placed in said notches between said extensions and said jaw plates.

3. A poultry gambrel comprising an elongated strut, means pivotally connected to one end of said strut for suspending the strut from a conveyor chain, a flat plate rigidly secured to said strut at the other end thereof and disposed substantially perpendicular to the longitudinal center line of said strut, spaced apart extensions projecting from said plates substantially in the plane of the latter and having concavely curved inner edge portions mutually opposed to each other, jaw assemblies pivotally mounted each at one end on said plate at respectively opposite sides of said strut and each including a jaw plate at its other end overlying the corresponding extension on said plate, each of said jaw plates having therein a notch opening to the distal edge thereof and extending inwardly of the inner edge of the corresponding extension, said jaw plates being movable relatively toward each other to a position at which the notches therein are disposed inwardly of the distal ends of said extensions to receive objects, such as poultry legs, placed therein and being movable away from each other to extend the inner edges of said extensions across the notches in said jaw plates and clamp objects placed in said notches between said extensions and said jaw plates, and spring means connected to said jaw assemblies eccentrically of the axes of the pivotal connections between said jaw assemblies and said plates and effective to resiliently urge said jaw assemblies together when they are moved toward each other past a predetermined position and to urge said jaw assemblies apart when they are moved away from each other past said predetermined position.

4. A poultry gambrel comprising an elongated strut, means pivotally connected to one end of said strut for suspending the strut from a conveyor chain, a flat plate rigidly secured to said strut at the other end thereof and disposed substantially perpendicular to the longitudinal center line of said strut, spaced apart extensions projecting from said plates substantially in the plane of the latter and having concavely curved inner edge portions mutually opposed to each other, jaw assemblies pivotally mounted each at one end on said plate at respectively opposite sides of said strut and each including a jaw plate at its other end overlying the corresponding extension on said plate, each of said jaw plates having therein a notch opening to the distal edge thereof and extending inwardly of the inner edge of the corresponding extension, said jaw plates being movable relatively toward each other to a position at which the notches therein are disposed inwardly of the distal ends of said extensions to receive objects, such as poultry legs, placed therein and being movable away from each other to extend the inner edges of said extensions across the notches in said jaw plates and clamp objects placed in said notches between said extensions and said jaw plates, and spring means connected to said jaw assemblies eccentrically of the axes of the pivotal connections between said jaw assemblies and said plates and effective to resiliently urge said jaw assemblies together when they are moved toward each other past a predetermined position and to urge said jaw assemblies apart when they are moved away from each other past said predetermined position, said plate including a portion disposed between said extensions, and a stop on said plate portion engaging said jaw plates at a limiting position of the latter adjacent each other.

5. A poultry gambrel comprising an elongated strut, means pivotally connected to one end of said strut for suspending the strut from a conveyor chain, a flat plate rigidly secured to said strut at the other end thereof and disposed substantially perpendicular to the longitudinal center line of said strut, spaced apart extensions projecting from said plates substantially in the plane of the latter and having concavely curved inner edge portions mutually opposed to each other, jaw assemblies pivotally mounted each at one end on said plate at respectively opposite sides of said strut and each including a jaw plate at its other end overlying the corresponding extension on said plate, each of said jaw plates having therein a notch opening to the distal edge thereof and extending inwardly of the inner edge of the corresponding extension, said jaw plates being movable relatively toward each other to a position at which the notches therein are disposed inwardly of the distal ends of the corresponding extensions to receive objects, such as poultry legs, placed therein and being movable away from each other to extend the inner edges of said extensions across the notches in said jaw plates and clamp objects placed in said notches between said extensions and said jaw plates, each of said jaw assemblies also including spring means urging the corresponding jaw plate in a direction to reduce the area of that portion of the notch in the jaw plate disposed inwardly of the inner edge of the corresponding plate extension.

6. A poultry gambrel comprising an elongated strut, means pivotally connected to one end of said strut for suspending the strut from a conveyor chain, a flat plate rigidly secured to said strut at the other end thereof and disposed substantially perpendicular to the longitudinal center line of said strut, spaced apart extensions projecting from said plates substantially in the plane of the latter and having concavely curved inner edge portions mutually opposed to each other, jaw assemblies pivotally mounted each at one end on said plate at respectively opposite sides of said strut and each including a jaw plate at its other end overlying the corresponding extension on said plate, each of said jaw plates having therein a notch opening to the distal edge thereof and extending inwardly of the inner edge of the corresponding extension, said jaw plates being movable relatively toward each other to a position at which the notches therein are disposed inwardly of the distal ends of the corresponding extensions to receive objects, such as poultry legs, placed therein and being movable away from each other to extend the inner edges of said extensions across the notches in said jaw plates and clamp objects placed in said notches between said extensions and said jaw plates, each of said jaw assemblies also including spring means urging the corresponding jaw plate in a direction to reduce the area of that portion of the notch in the jaw plate disposed inwardly of the inner edge of the corresponding plate extension, the inner edges of said extensions being curved in a direction to also reduce the area of the portions of said notches disposed inwardly of the inner edges of said extensions as said jaw plates move in a direction from the distal toward the proximal ends of the corresponding extensions.

JOSEPH M. LITTJOHANN.

REFERENCES CITED

The following references are of record in the file of this patent:

UNITED STATES PATENTS

| Number | Name | Date |
|---|---|---|
| 1,019,086 | Quinn | Mar. 5, 1912 |
| 2,152,083 | Onorato et al. | Mar. 28, 1939 |
| 2,435,706 | Barker | Feb. 10, 1948 |